United States Patent Office 3,706,088
Patented Dec. 12, 1972

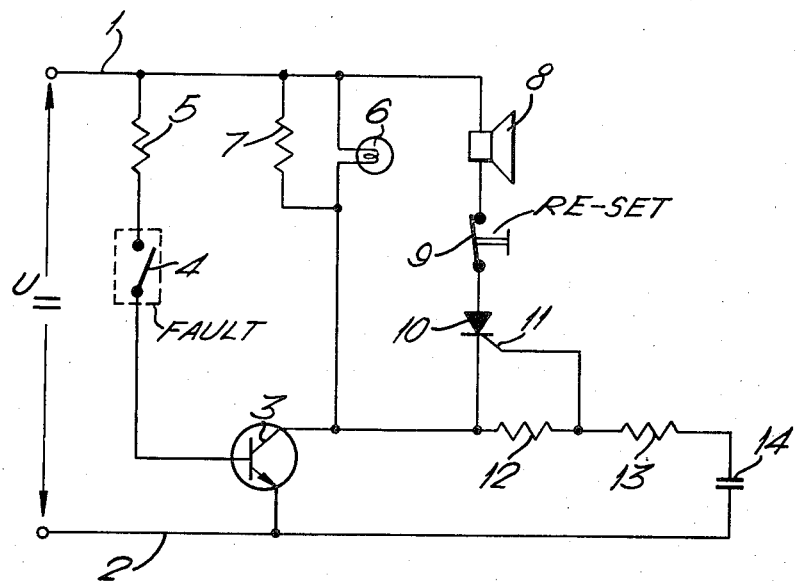

3,706,088
SWITCHING MEANS FOR AN ALARM SYSTEM
Aage Hojgaard Jorgensen, Sonderborg, Denmark, assignor
to Danfoss A/S, Nordborg, Denmark
Filed June 28, 1971, Ser. No. 157,109
Claims priority, application Germany, Aug. 8, 1970,
P 20 39 532.8
Int. Cl. G08b 21/00
U.S. Cl. 340—248 R                         5 Claims

ABSTRACT OF THE DISCLOSURE

The invention relates to an alarm system switching arrangement in which a transistor is switched on by a fault sensing or response switch in the base circuit. A first circuit branch in series with the transistor contains an alarm device, a hand operated switch and a controllable rectifier. A storage capacitor is connected to the rectifier control terminal and a capacitor charging branch is in parallel with said first circuit branch. The hand operated switch may be momentarily actuated to turn off the alarm device but this does not interfere with the resetting of the circuit after the sensed fault has been eliminated by reason of the capacitor being rechargeable through the parallel branch charging line.

---

The invention relates to a switching means for an alarm system, in which means a switching element, that closes when a fault occurs, sets off an alarm device, which can be manually switched off by briefly actuating an automatic-return hand-operated switch, so that the alarm device automatically returns to the "ready" position when the fault has been eliminated.

Switching means for alarm systems of this kind enable the fault to be recorded after the alarm device has responded and then enables the alarm device, e.g. a siren, to be switched off. The alarm device is however prevented from remaining switched off after the fault has been eliminated since there would be no warning of a further fault if it were.

In a known switching means for an alarm system, the switching element that is actuated when a fault occurs is the working contact of a first relay which is energized when a fault occurs. The resting contact of a second relay, which can be energized by the hand-operated switch, is arranged in series with the switching element, actuated when a fault occurs, and the alarm device. The hand-operated switch is by-passed by a series arrangement comprising a further working contact of the first relay and a working contact of the second relay. This ensures that when the hand-operated switch is briefly actuated, the second relay remains pulled up and the alarm device circuit is kept open until the first relay is de-energized when the fault is eliminated. This switching arrangement is complicated, expensive and requires two relays.

The object of the invention is to provide a switching means for an alarm system of the initially described kind, which means is of simpler design, requires no relay and can therefore be produced more cheaply.

According to the invention, this object is achieved by the alarm device, the hand-operated switch and a controllable rectifier being arranged in series, by a condenser, which can be charged by the D.C. feed voltage, being dischargeable through a resistor and the switching element actuated when a fault occurs, and by it being possible to tap off the control voltage for the rectifier at this resistor.

In this switching arrangement, the hand-operated switch can be arranged directly in series with the alarm device. The controllable rectifier is rendered conductive as soon as the switching element, actuated when a fault occurs, closes and the condenser discharges through the associated resistor. The alarm device is then caused to operate. By briefly actuating the hand-operated switch, the alarm device is switched off since the controllable rectifier remains in the blocked state after the current has been interrupted and it receives no fresh control impulse from the condenser. Only after the fault has been eliminated and the switching element, that is actuated by the fault, closes again, can the condenser be charged afresh, so that the original "ready" position is again established.

It is of particular advantage if the switching element, actuated when a fault occurs, is a transistor, to the base of which the feed voltage is applied through a member that responds to the occurrence of a fault. This member does not need to be a mechanical contact; instead, it can be constituted by a temperature-responsive resistor, a photoelectric switch or the like. Thus, a minimum of mechanically moved parts is required.

A current-limiting resistor can be arranged between the condenser and the control resistor. This current-limiting switch ensures that the condenser does not discharge too rapidly.

Furthermore, a charging resistor, which by-passes at least the controllable rectifier, can be arranged in series with the switching element actuated when an error occurs. This charging resistor is non-effective as long as the switching element that responds to a fault is conductive. The condenser can however charge through the loading resistor when the switching element that responds to a fault is closed.

It is particularly advantageous if the switching element that is actuated when a fault occurs is arranged in series with a warning light which by-passes the alarm device, the hand-operated switch and the controllable rectifier. This warning light remains on as long as the fault is present, i.e. even when the alarm device has been switched off.

There is no difficulty in connecting the warning light and the condenser control circuit to the switching element that is actuated when a fault occurs, in such manner that this latter element can fulfil the twofold function. Here, the warning light can even be used as the loading resistor. Then however it is expediently by-passed by an additional resistor so that if the light should burn out, the charging of the condenser and thus the operation of the alarm device are not jeopardized.

The invention will now be described by reference to an embodiment illustrated by way of the circuit diagram seen in the attached drawing.

A D.C. voltage $U_=$ is applied to the leads 1 and 2. A switching element that is actuated when a fault occurs takes the form of a transistor 3. Its base is connected to the lead 1 through a member 4, responsive to a fault, here illustrated as a simple switch, and through a resistor 5; the emitter of the transistor is connected to the lead 2, and its collector is connected to the lead 1 through a warning light 6 and an additional resistor 7 which by-passes this light. Arranged in parallel with the light 6 is the series connection consisting of an alarm device 8, e.g. a siren, an automatic-return hand-operated switch 9 and a controllable rectifier 10. The control electrode 11 of the latter is connected at a point between two resistors 12 and 13, which are arranged in series with a condenser 14. This series arrangement is connected on the one hand to the collector of the transistor 3 and on the other to the lead 2.

When the member 4 closes upon the occurrence of a fault, the transistor 3 becomes conductive. Consequently, the warning light 6 comes on. At the same time, the condenser 14, previously charged through the resistors 7, 12 and 13, discharges through the transistor 3. This results in a voltage-drop at the resistor 12, and this causes the controllable rectifier 10 to ignite. A current then flows through the alarm device 8, i.e. the siren sounds.

After the fault has been recorded, the alarm device 8 can be switched off by briefly actuating the hand-operated switch 9, since because of interruption of the current the rectifier 10 returns to the closed position, so that when the hand-operated switch 9 is closed, the path through the alarm device 8 is interrupted. Further ignition of the rectifier 10 is not possible since the condenser 14 could not be charged in the meantime. Only when the responsive member 4 is opened and the transistor 3 thus blocked, does the warning light 6 go out and the condenser 14 charge again through the resistors 7, 12 and 13, so that upon renewed actuation of the responsive member 4, the alarm device 8 operates again.

Modifications of various kinds are possible. The alarm device can be replaced by some other element, e.g. a winking light, a bell or the like. The hand-operated switch 4 can be linked to a recording means which ensures that the switch opens only after the fault has been recorded.

I claim:

1. An alarm system circuit comprising a switching element having a control terminal; a normally open fault responsive switch connected to said terminal; a first series branch including an alarm device, a hand operated switch and a controllable rectifier having a control terminal; said first series branch being in series with said switching element; said rectifier having a control terminal; a charging branch in parallel with said first series branch; and a storage capacitor connected to said rectifier control terminal and being in series with said charging branch.

2. An alarm system circuit according to claim 1 wherein said switching element is a transistor and said control terminal thereof is the base of said transistor.

3. An alarm system circuit according to claim 1 including storage and current limiting resistors in series with said capacitor, said control terminal of said controllable rectifier being connected between said resistors.

4. An alarm system circuit according to claim 1 wherein said charging branch includes a charging resistor.

5. An alarm system circuit according to claim 4 including a warning light in parallel with said charging resistor.

References Cited
UNITED STATES PATENTS

| | | | |
|---|---|---|---|
| 3,264,634 | 8/1966 | Voigt | 340—384 E |
| 3,425,050 | 1/1969 | Tellerman et al. | 340—256 |
| 3,518,655 | 6/1970 | Saul | 340—276 X |
| 3,555,532 | 1/1971 | White et al. | 340—328 UX |
| 3,566,390 | 2/1971 | Zevas | 340—330 |
| 3,594,771 | 7/1971 | Uthene | 340—276 |

JOHN W. CALDWELL, Primary Examiner

D. MYER, Assistant Examiner

U.S. Cl. X.R.

340—213 R, 384 E